United States Patent [19]

Vatne

[11] Patent Number: 4,758,818
[45] Date of Patent: Jul. 19, 1988

[54] SWITCHABLE COLOR FILTER AND FIELD SEQUENTIAL FULL COLOR DISPLAY SYSTEM INCORPORATING SAME

[75] Inventor: Rolf S. Vatne, Beaverton, Oreg.

[73] Assignee: Tektronix, Inc., Beaverton, Oreg.

[21] Appl. No.: 535,504

[22] Filed: Sep. 26, 1983

[51] Int. Cl.[4] .............................................. G09G 3/36
[52] U.S. Cl. ..................................... 340/701; 340/702; 340/784; 340/815.1; 350/335; 350/388
[58] Field of Search ............... 340/701, 703, 757, 784, 340/794, 795, 815.06, 815.07, 815.1, 716; 350/337, 352, 350 R, 347 E, 345, 403, 404, 408, 335, 387, 388

[56] References Cited

U.S. PATENT DOCUMENTS

| 2,586,635 | 2/1952 | Fernsler | 350/408 X |
|---|---|---|---|
| 2,638,816 | 5/1953 | Stolzer | 88/61 |
| 2,715,153 | 8/1955 | Sziklai | 350/408 X |
| 2,753,763 | 7/1956 | Haines | 350/408 |
| 2,834,254 | 5/1958 | Sage | 88/106 |
| 3,482,182 | 12/1969 | Kosanke et al. | 350/403 X |
| 3,536,921 | 10/1970 | Caulfield | 350/403 X |
| 3,703,329 | 11/1972 | Castellano | 350/150 |
| 3,806,227 | 4/1974 | Ureusu et al. | 350/337 |
| 4,003,081 | 1/1977 | Hilsum et al. | 358/64 |
| 4,017,156 | 4/1977 | Muriyama et al. | 350/403 X |
| 4,019,808 | 4/1977 | Scheffer | 350/160 LC |
| 4,025,164 | 5/1977 | Doriguzzi et al. | 350/408 X |
| 4,061,417 | 12/1977 | Kasagiri | 350/352 |
| 4,097,128 | 6/1978 | Matsumoto et al. | 350/347 E X |
| 4,103,260 | 7/1978 | Buchman | 350/403 X |
| 4,239,349 | 12/1980 | Scheffer | 350/337 X |
| 4,241,339 | 12/1980 | Ushiyama | 340/784 X |
| 4,328,493 | 5/1982 | Shanks et al. | 340/784 |
| 4,403,832 | 9/1983 | Tanaka et al. | 350/337 X |
| 4,461,543 | 7/1984 | McMahon | 350/403 X |
| 4,471,351 | 9/1984 | Anderson | 340/795 X |
| 4,497,543 | 2/1985 | Aoki et al. | 350/337 |

FOREIGN PATENT DOCUMENTS 0052000 5/1982 European Pat. Off. .
2260155 8/1975 France .
637310 5/1950 United Kingdom .

OTHER PUBLICATIONS

A. N. Brinson and A. D. Edgar, "Liquid Crystal Apparatus for Converting Black and White CRT Display into Colored Display", *IBM Technical Disclosure Bulletin*, vol. 22, No. 5, Oct. 1979, pp. 1769-1772.

Primary Examiner—Marshall M. Curtis
Assistant Examiner—Vincent P. Kovalick
Attorney, Agent, or Firm—John D. Winkelman; Paul S. Angello

[57] ABSTRACT

A switchable color filter comprising a pair of twisted nematic liquid crystal devices (126 and 128) and a light polarizing system (108) which includes three color selective polarizing filters (102, 104, and 106) is incorporated as an optical subassembly in a field sequential color display system (100) to provide output states of white light and light of three different colors to form an image in full color and high brightness with strong color contrast.

11 Claims, 1 Drawing Sheet

SWITCHABLE COLOR FILTER AND FIELD SEQUENTIAL FULL COLOR DISPLAY SYSTEM INCORPORATING SAME

TECHNICAL FIELD

This invention relates to color switches, and in particular, a switchable color filter which includes a pair of twisted nematic liquid crystal devices and three color selective polarizing filters and which a preferred utilization thereof is in a field sequential display system to provide output states of white light and light of three different colors to form an image in full color and high brightness with strong color contrast.

BACKGROUND OF THE INVENTION

Switchable color filters have been known heretofore to be positioned in front of black and white cathode ray tubes of field sequential color display systems to produce light images in full color. One type of display system utilizes birefringent materials in an attempt to provide a display with an acceptable color contrast ratio.

One such display system is disclosed in U.S. Pat. No. 2,638,816 of Stolzer who describes an adapter which receives light emitted from a black and white television set and produces a light image in different colors. The adapter includes passive birefringent sheets which develop light of different colors. A half-wave optical retardation device operates as a light gate which transmits light of the desired color in the proper sequence in synchronism with the frames of image information appearing on the black and white television screen.

One disadvantage inherent in the device of Stolzer is that the colors developed from the transmission of light through passive birefringent sheets are generally impure and vary in appearance as a function of the viewing angle. The adapter also employs interdigitated electrodes which present a pattern of lines across the display screen. The device of Stolzer, therefore, produces color images which are not acceptable for most image display applications.

U.S. Pat. No. 4,003,081 of Hilsum et al. describes a color display system which incorporates an optically active twisted nematic liquid crystal cell that includes a separate layer of passive birefringent material to produce light of different colors. Light of the desired color is selectably transmitted through a system of neutral polarizers in response to a change in the frequency or intensity of an electric field applied to the liquid crystal cell.

U.S. Pat. No. 4,019,808 of Scheffer describes a color display system which is similar to that of Hilsum et al. Scheffer employs a twisted nematic liquid crystal cell in combination with a passive birefringent optical retardation plate or sheet to produce light of different colors. Both of the display systems described by Hilsum et al. and Scheffer produce light images which exhibit colors of an impure quality that is generally characteristic of the colors developed from passive birefringent materials. The twisted nematic liquid crystal cells are utilized in both systems to rotate the plane of polarization of light passing therethrough.

U.S. Pat. No. 4,097,128 of Matsumoto et al. describes a color display device which incorporates a tunable birefringent liquid crystal cell that functions as a variable optical retarder whose birefringence is changed to develop light of various colors. The liquid crystal cell is included in an assembly of neutral polarizers which transmit light of different colors in response to a change in the birefringence of the liquid crystal cell to provide an image in full color. The change in birefringence is accomplished by varying the magnitude of a voltage which is applied to the cell. As shown in FIG. 4 of the patent, the maximum transmittance of light of a particular primary color is not accompanied by a minimum transmittance of light of the remaining primary colors. The Matsumoto et al. device is incapable, therefore, of providing light of pure quality. Moreover, devices using the birefringence properties of a liquid crystal material to produce light of different colors typically exhibit slow switching responses and limited viewing angles.

Another type of color display system employs liquid crystal materials which include pleochroic dyes to produce light of different colors. For example, U.S. Pat. No. 3,703,329 of Castellano describes such a color display system which comprises three cells each including a solution consisting of a pleochroic dye in a nematic liquid crystal composition. The alignment of the liquid crystal molecules causes alignment of the pleochroic dye dissolved therein. An electric field applied to the cell alters the alignment of the liquid crystal molecules and thereby alters the alignment of the dye in the liquid crystal combination to change the color of light observed at the output of the device.

Since the pleochroic dye is absorbed along one axis of the liquid crystal cell, an output state of white light can be provided when the electric field causes the molecules of the three liquid crystal cells to align maximally in a planar relationship.

The colored light developed from liquid crystal cells having pleochroic dyes suffers from poor color contrast. Expensive measures must be undertaken to increase the optical density of the cell to provide the desired color saturation.

Anotner type of color display system utilizes optical assemblies which incorporate liquid crystal polarization switching devices in combination with color selective linear polarizing filters. An example of such a display system is disclosed in IBM Technical Disclosure Bulletin, Vol. 22, No. 5, Oct. 1979, pp. 1769-1772, "Liquid Crystal Apparatus for Converting Black and White CRT Display into Colored Display" by A. N. Brinson and A. D. Edgar who describe a switchable color filter that incorporates liquid crystal devices for converting a black and white cathode ray tube image into a full color image.

A light output of selectable colors is achieved by Brinson et al. through the use of three linear polarizing filters. Each one of two twisted nematic liquid crystal cells is disposed between a different pair of adjacent ones of the three polarizing filters to form an assembly which is optically coupled to a black and white cathode ray tube display. One of the polarizing filters comprises a neutral linear polarizer which is positioned adjacent the cathode ray tube display screen to pass linearly polarized white light through only one polarization axis. Each of the other polarizers constitutes a color selective polarizing filter having orthogonally aligned polarization axes which pass light of different colors. Voltages are applied to the liquid crystal devices in a predetermined sequence to produce a display in which three colors are cyclicly displayed to form an image in full color.

The system described hereinabove suffers from the disadvantage of requiring the use of a neutral linear polarizer at the input end of the switchable color filter and is incapable of producing an output state of white light.

That a color display system could be provided with the use of a switchable color filter which comprises three twisted nematic liquid crystal pularization rotating switches in combination with four linear polarizing filters including three color selective and one neutral linear polarizing filters was known to the inventor prior to his invention of the display system disclosed herein. This prior art color display system is shown in FIG. 1.

With reference to FIG. 1, the prior art color display system includes a switchable color filter which comprises three spaced-apart twisted nematic liquid crystal polarization rotating switches or devices 10, 12, and 14 which are optically coupled to and disposed between three pairs of linear polarizing filters 16 and 18, 18 and 20, and 20 and 22, respectively. Each one of the linear polarizing filters has orthogonally aligned transmission and absorption axes. Polarizing filter 16 is a neutral polarizer which transmits linearly polarized white light through its transmission axis 24 and no light through its absorption axis 26. Each one of polarizing filters 18, 20, and 22 is a color selective linear polarizer which passes white light through its transmission axis and passes through its absorption axis light of a color that is different from that passed by the other color selective polarizers.

In an exemplary embodiment, color selective polarizers 18, 20, and 22 pass white light through transmission axes 28, 30, and 32, respectively, and light of the primary colors red, green, and blue through absorption axes 34, 36, and 38, respectively. The presence of a voltage signal of the proper magnitude across any one of liquid crystal devices 10, 12, and 14 leaves unchanged the plane of polarization of the light rays passing through the device. This is referred to as the "ON" state of the device. The absence of a voltage signal across any one of the liquid crystal devices imparts a 90° rotation to the plane of polarization of light passing through the device. This is referred to as the "OFF" state of the device.

In operation, the switchable color filter formed by liquid crystal devices 10, 12, and 14 and polarizers 16, 18, 20, and 22 is positioned in front of light image generator 40 which emits white light from phosphor screen 42. Image generator 40 is typically a black and white television set. Neutral polarizing filter 16 receives the light emitted from screen 42 and transmits the light through its transmission axis 24 to the remaining components of the switchable color filter. Light rays which exit the switchable color filter through polarizing filter 22 in the colors red, green, or blue are optically processed in accordance with the switching states of liquid crystal devices 10, 12, and 14 as indicated in Table I.

TABLE I

| State of Liquid Crystal Device 10 | State of Liquid Crystal Device 12 | State of Liquid Crystal Device 14 | Net Color Through Transmission Axis 32 of Polarizing Filter 22 | Net Color Through Absorption Axis 38 of Polarizing Filter 22 |
|---|---|---|---|---|
| ON | OFF | ON | RED | — |
| OFF | OFF | OFF | GREEN | — |
| OFF | ON | OFF | — | BLUE |
| OFF | ON | ON | WHITE | — |

"OFF" state imparts 90° rotation to plane of linearly polarized light.
"ON" state imparts no rotation to plane of linearly polarized light.

A light image in full color is produced at the output of polarizing filter 22 when the switchable color filter is switched in synchronism with the frames of image information appearing on the black and white television screen 42. As indicated in Table I, an output state of white light is obtainable with this display system.

The above-described switchable color filter is expensive in that it incorporates seven optical components and necessitates the use of complex driver circuitry to actuate each of the three liquid crystal switches in the proper sequence to provide a light output of the desired color. Moreover, a switchable color filter which includes such a relatively large number of optical components attenuates the intensity of light passing therethrough and thereby produces an image of diminished brightness.

SUMMARY OF THE INVENTION

One of the objects of this invention is to provide a switchable color filter which is utilized in a field sequential display system to provide a light image in full color with strong color contrast and a high degree of brightness and resolution.

Another object of this invention is to provide such a switchable color filter which employs three color selective linear polarizing filters and two twisted nematic liquid crystal devices to provide output states of white light and light of three different colors.

A further object of this invention is to provide such a switchable color filter which provides an output state of white light in the absence of a neutral polarizing filter.

Still another object of this invention is to provide such a switchable color filter which includes three color selective linear polarizing filters and produces output states of white light and light of three different colors whenever the orthogonally aligned polarization axes of each of the polarizing filters are disposed at 0° or 90° angles and lie in parallel planes relative to the polarization axes of the other polarizing filters.

The present invention relates to a switchable color filter which receives light from a light source having light components that can be combined to form white light. The switchable color filter comprises three color selective polarizing means or filters which form a light polarizing system with input means and output means. The input means is optically coupled to the light source. Each one of a pair of polarization switching means is disposed between a different pair of the three color selective polarizing means of the light polarizing system. A control means communicates with the pair of polarization switching means to selectably pass from the output means light of one of three colors or white light.

The switchable color filter of the present invention is disclosed herein by way of example as an optical subassembly of a field sequential full color display system. The color display system disclosed herein differs from prior systems such as the one disclosed by Brinson et al. in the IBM Technical Disclosure Bulletin discussed hereinabove in that it includes a switchable color filter which eliminates the neutral linear polarizer and employs a third color selective linear polarizing filter to produce output states of white light and light of three different colors.

In a preferred embodiment of the invention, light from a cathode ray tube or projection device capable of emitting white light is received by the input of the light polarizing system. Each of the three color selective linear polarizers in the light polarizing system has orthogonally related polarization states or axes. For each polarizer, light of one primary color which is different from the primary colors passed by the other color selective polarizers passes through its absorption axis and white light passes through its transmission axis.

Each one of two twisted nematic liquid crystal devices is optically coupled to and disposed between different pairs of adjacent polarizing filters to orient the plane of polarization of light passing therethrough in accordance with the frequency of an electric field produced by an AC voltage signal which is applied to the device.

The AC voltage signal applied to the liquid crystal device is produced by the control circuit or means which comprises a drive subcircuit having a pair of separate outputs, each of which drives one of the liquid crystal devices and produces two AC pulses of different frequencies or control circuit output states to orient the plane of polarization of light passing through the device. Light of one of three different colors or white light is produced at the output of the switchable color filter in accordance with the four possible combinations of control circuit output states. A light image in full color is formed on a display by means of switching the light output of the three colors in synchronism with the frames of image information emitted by the light source.

The output state of white light is especially advantageous in a field sequential system which uses a vector display mode cathode ray tube. Such a system direct writes the color information with an electron beam to form a light image on a display. A color display system which does not have a white light output state requires three writing time intervals to sequentially display red, green, and blue color information to form an output of white light. This procedure for synthesizing white light reduces to one-third the writing speed of a vector display mode system which is incapable of providing an output state of white light.

The color display system of the present invention provides output states of white light and light of three different colors whenever the orthogonally aligned polarization axes of each of the polarizing filters are disposed at 0° or 90° angles and lie in parallel planes relative to the polarization axes of the other polarizing filters. As the relative orientation of the polarization axes of the polarizing filters changes, the particular combination of control circuit output states which produce a light output of a given color or white light changes accordingly.

Due to the relatively few optical components utilized, the light image appears on a display with a high degree of brightness. The use of color selective polarizing filters produces colors of a pure quality which is not obtainable with systems utilizing the birefringence properties of liquid crystal devices or passive birefringent sheets to produce colored light. Thus, a light image with strong color contrast and a high degree of brightness is achieved. The use of only two liquid crystal devices as polarization rotating switches simplifies the drive subcircuit design as well as decreases its power consumption.

Additional objects and advantages of the present invention will be apparent from the following detailed description of a preferred embodiment thereof which proceeds with reference to the accompanying drawings.

DETAILED DESCRIPTION OF PREFERRED EMBODIMENT

Figure 1:
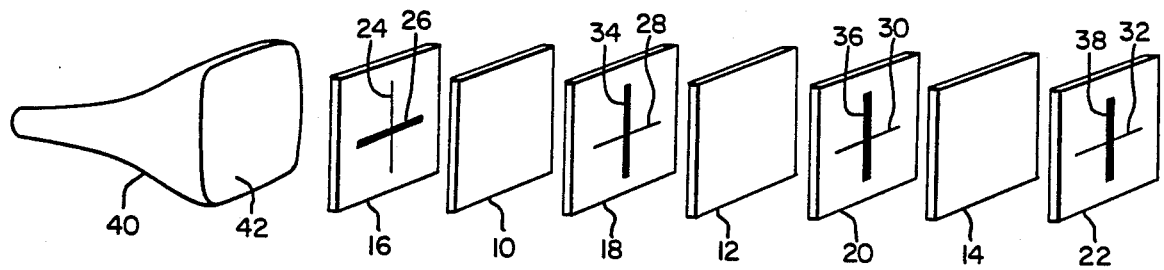
FIG. 1 is a simplified block diagram of a prior art field sequential color display system including a switchable color filter of three twisted nematic liquid crystal polarization rotating devices and four linear polarizing filters.
Figure 2:
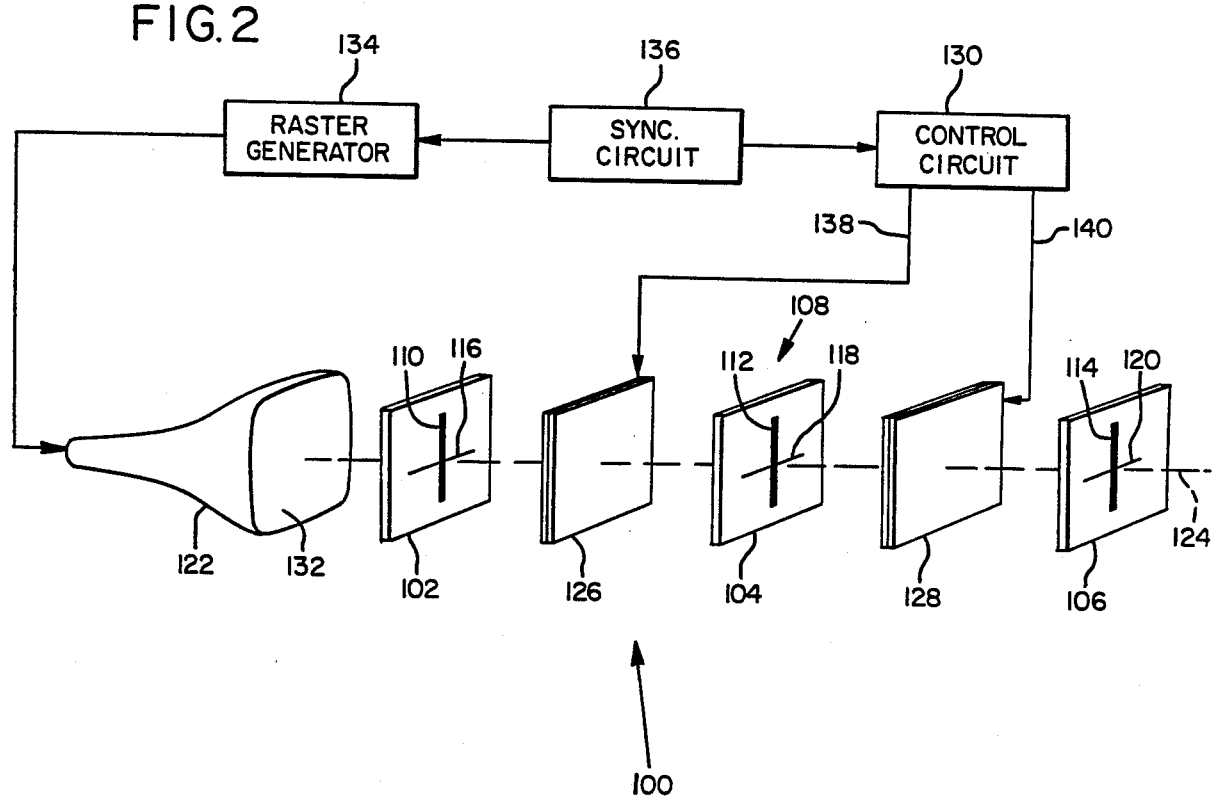
FIG. 2 is a simplified block diagram of a preferred embodiment of a field sequential color display system incorporating a switchable color filter of two liquid crystal devices and three color selective linear polarizing filters to provide output states of white light and light in three different colors to form an image in full color in accordance with the present invention.

With reference to FIG. 2, a preferred embodiment of a field sequential color display system 100 designed in accordance with the present invention includes three color selective polarizing means or linear polarizing filters 102, 104, and 106 which form a light polarizing system 108. Each one of polarizing filters 102, 104, and 106 has first and second orthogonally related polarization states or axes. The first polarization axis of each polarizing filter 102, 104, and 106 is an absorption axis 110, 112, and 114, respectively. The absorption axis of each polarizing filter passes linearly polarized light of at least one color which is different from the colors passed through the absorption axes of the other polarizing filters. In a preferred embodiment, absorption axes 110, 112, and 114 pass light of the primary colors red, green, and blue, respectively. The second polarization axis of each polarizing filter 102, 104, and 106 is a transmission axis 116, 118, and 120, respectively. The transmission axes of the three polarizing filters pass linearly polarized white light.

Light rays emitted from a light source 122 are received by polarizing filter 102 which serves as the input means of light polarizing system 108. The light rays are optically coupled to each polarizing filter to form optical path 124 through the light polarizing system. Light of one of the three primary colors or white light exits through polarizing filter 106 which serves as an output means of light polarizing system 108 as will be further hereinafter described.

Each one of a pair of polarization rotating switches or switching means 126 and 128 is disposed between a different pair of adjacent ones of polarizing filters 102, 104, and 106 to selectably rotate the plane of linearly polarized incident light between 0° and 90° in response to the output signals of control circuit or means 130. Polarization rotating switches 126 and 128 are disposed respectively between polarizing filters 102 and 104 and polarizing filters 104 and 106. In a preferred embodiment, each one of polarization rotation switches 126 and 128 is a twisted nematic liquid crystal device which includes a liquid crystal material mixture characterized by a dielectric anisotropy that changes sign as a function of the frequency of an AC voltage signal which is applied to the device by control circuit 130.

The switchable color filter formed by polarizing filters 102, 104, and 106 and polarization rotation switches 126 and 128 is positioned in front of light source 122, which emits light of many wavelengths from phosphor screen 132, to produce a light image in the red, green, and blue colors. In a preferred embodiment of the display system, light source 122 constitutes a cathode ray tube or a projection device which provides a black and white display image. A signal produced by a raster generator 134 in response to the output of a frame synchronization circuit 136 provides a television type raster scan which presents frames of image information in repetitive sequences of three time intervals.

In the first time interval, information relating to both the form of the image which is to appear in a first color, such as red, and the form of the image which is to appear in a color that is the combination of the color red and second and third colors, such as green and blue, respectively, is written on phosphor screen 132. In the second time interval, information relating to both the form of the image which is to appear in the color green and the form of the image which is to appear in a color that is a combination of the colors red, green, and blue is written on phosphor screen 132. In the third time interval, information relating to both the form of the image which is to appear in the color blue and the form of the image which is to appear in a color that is a combination of the colors red, green, and blue is written on phosphor screen 132.

Control circuit 130 receives at its input a signal from the output of frame synchronization circuit 136 and produces two output control signals at outputs 138 and 140 to drive liquid crystal devices 126 and 128 synchronously with the sequential frame rate of image information produced by light source 122.

Control circuit 130 responds to the output signal of circuit 136 by presenting at each of its outputs 138 and 140 one of two AC voltage signals of different frequencies. Control circuit outputs 138 and 140 are connected to the switching control inputs of liquid crystal devices 126 and 128, respectively. Whenever an output of control circuit 130 applies a relatively low frequency AC voltage signal of approximately 200-500 Hz, the liquid crystal device assumes the "OFF" state which imparts a 90° rotation of the plane of polarization of the light rays passing through the device. Whenever an output of control circuit 130 applies a relatively high frequency AC voltage signal of approximately 80-100 kHz, the liquid crystal device assumes the "ON" state and leaves unchanged the plane of polarization of the light rays passing through the device.

During the first time interval, therefore, a low frequency signal appears at output 138 to command liquid crystal device 126 to the "OFF" state and a high frequency signal appears at output 140 to command liquid crystal device 128 to the "ON" state. Red light passes through absorption axis 110 and white light passes through transmission axis 116 of polarizing filter 102. Since liquid crystal device 126 is in the "OFF" state, the planes of polarization of light passing through polarizing filter 102 are rotated 90° so that red light is incident on transmission axis 118 and white light is incident on absorption axis 112 of polarizing filter 104. Polarizing filter 104 passes only green light through its absorption axis 112 and red light through its transmission axis 118.

Since liquid crystal device 128 is in the "ON" state, the planes of polarization of light passing therethrough remain unchanged. Polarizing filter 106 passes no light through its absorption axis 114 and red light through its transmission axis 120. During the first time interval, therefore, the image components in colors other than red appearing on phosphor screen 132 are eliminated.

During the second time interval, low frequency signals appear at outputs 138 and 140 to command both liguid crystal devices 126 and 128 to the "OFF" state. As was the case during the first time interval in which liquid crystal device 126 was in the "OFF" state, polarizing filter 104 passes only green light through its absorption axis 112 and red light through its transmission axis 118. Since liquid crystal device 128 is in the "OFF" state, the planes of polarization of light passing therethrough are rotated 90° so that red light is incident on absorption axis 114 and green light is incident on transmission axis 120 of polarizing filter 106. Polarizing filter 106 passes no light through its absorption axis 114 and green light through its transmission axis 120. During tne second time interval, therefore, the undesired image components in colors other than green appearing on phosphor screen 132 are eliminated.

During the third time interval, a high frequency signal appears at output 138 to command liquid crystal device 126 to the "ON" state and a low frequency signal appears at output 140 to command liquid crystal device 128 to the "OFF" state. Red light passes through absorption axis 110 and white light passes through transmission axis 116 of polarizing filter 102. Since liquid crystal device 126 is in the "ON" state, the planes of polarization of light passing therethrough remain unchanged. Polarizing filter 104 passes no light through its absorption axis 112 and white light through its transmission axis 118. Since liquid crystal device 128 is in the "OFF" state, the plane of polarization of the white light passing therethrough is rotated 90° so that the white light is incident on absorption axis 114 of polarizing filter 106. Polarizing filter 106 passes blue light through its absorption axis 114. During the third time interval, therefore, the image components in colors other than blue appearing on phosphor screen 132 are eliminated.

An output state of white light is provided when both liquid crystal devices 126 and 128 are commanded to the "ON" state, thereby causing no rotation of the polarization of the light passing through the polarizing filters. Red light passes tnrough absorption axis 110 of polarizing filter 102 but is blocked by absorption axis 112 of polarizing filter 104. White light passes through transmission axes 116, 118, and 120.

Table II summarizes the colors of the light output obtained from the various switching states of liquid crystal devices 126 and 128 for the above-described preferred embodiment.

TABLE II

| State of Liquid Crystal Device 126 | State of Liquid Crystal Device 128 | Net Color Through Transmission Axis 114 of Polarizing Filter 106 | Net Color Through Transmission Axis 120 of Polarizing Filter 106 |
| --- | --- | --- | --- |
| OFF | OFF | — | GREEN |
| OFF | ON | — | RED |
| ON | OFF | BLUE | — |
| ON | ON | — | WHITE |

"OFF" state imparts 90° rotation to plane of linearly polarized light.
"ON" state imparts no rotation to plane of linearly polarized light.

It will be understood that the above-described switchable color filter produces output states of light in one of three colors or white light whenever the polarization axes of each of the polarizing filters are disposed at 0° or 90° angles and lie in parallel planes relative to the polarization axes of the other polarizing filters. It will be observed that the present invention transmits light concurrently from both polarization axes 110 and 116 of polarizing filter 102 and, therefore, produces the desired light output by virtue of the absence of a neutral linear polarizing filter at the input of the light polarizing system.

The sequentially displayed frames of image information provided in the three time intervals are transmitted through polarizing filter 102 and are synchronously transmitted through polarizing filters 104 and 106 and liquid crystal devices 126 and 128. This provides in each time interval a light image in the color corresponding to the image information presented to the light source. The retinal persistence of the observer's eyes integrates the information exiting polarizing filter 106 during the three intervals of time corresponding to the three frames of the television raster signal to create the impression of a single display image in full color. Intensity modulation of the light image source produces a color gamut over tne full spectral range of visible light.

It will be obvious to those having skill in the art that many changes may be made in the above-described details of the preferred embodiment of the present invention. The scope of the present invention, therefore, should be determined only by the following claims.

I claim:

1. a switchable color filter which receives from a light source light of plural wavelength components that can be combined to form white light, comprising:
   three color selective polarizing filters in optical communication with the light source, each one of the polarizing filters having a polarization state which passes white light;
   a single pair of polarization switching means, each one of the pair of polarization switching means being positioned between a different pair of the three polarizing filters; and
   control means in communication with the pair of polarization switching means to selectively pass light of one of three colors or white light.

2. The switchable color filter of claim 1 in which each one of the three polarizing filters has subtantially orthogonally related polarization states, one polarization state of each of the polarizing filters passing light of at least one color which is different from the colors passed by one of the polarization states of the other two of the three polarizing filters.

3. The switchable color filter of claim 1 in which each one of the three polarizing filters comprises a linear polarizing filter with substantially orthogonally aligned polarization axes.

4. The switchable color filter of claim 1 in which each one of the pair of polarization switching means comprises a twisted nematic liquid crystal device.

5. The switchable color filter of claim 1 in which the light source is a cathode ray tube emitting a black and white light image which includes wavelength components that can be transmitted by the polarizing filters.

6. A field sequential color display system, comprising:
   a light source having plural wavelength components that can be combined to form white light;
   image information generating means in communication with the light source to produce light image information;
   three color selective polarizing means in optical communication with the light source, each one of the polarizing means having a polarization shaft which passes white light;
   a single pair of polarization switching means, each one of the pair of polarization switching means being disposed between a different pair of the three polarizing means;
   control means in communication with the pair of polarization switching means to selectively pass a light output of one of three colors or white light; and
   synchronizing means to synchronize a light output of one of the three colors or white light to a predetermined one of the light image information to provide a light image in a desired color.

7. The color display system of claim 6 in which each one of the three polarizing means has substantially orthogonally related polarization states, one polarization state of each of the polarizing means passing light of at least one color which is different from the colors passed by one of the polarization states of the other two of the three polarizing means.

8. A switchable color filter which receives from a light source light of plural wavelength components that can be combined to form white light, comprising:
   three color selective polarizing filters in optical communication with the light source, each one of the polarizing filters having substantially orthogonally related polarization states, one of the polarization states of each one of the polarizing filters passing white light;
   a single pair of polarization rotating switches, each one of the pair of polarization rotating switches comprising a liquid crystal cell of the twisted nematic type and a being disposed between a different pair of the three polarizing filters; and
   control means in communication with the pair of polarization rotating switches to selectively pass light of one of three colors or white light.

9. The switchable color filter of claim 8 in which one polarization state of each of the polarizing filters passes light of one color which is different from the colors passed by one of the polarization states of the other two of the three polarizing filters.

10. The switchable color filter of claim 8 in which each one of the three polarizing filters comprises a linear polarizing filter with two substantially orthogonally aligned polarization axes.

11. The switchable color filter of claim 10 in which for each linear polarizing filter, one of the two polarization axes passes colored light and the other of the two polarization axes passes white light.

* * * * *